(12) United States Patent
Liu et al.

(10) Patent No.: US 11,347,516 B2
(45) Date of Patent: May 31, 2022

(54) PROCESSING DEVICE AND RELATED PRODUCTS

(71) Applicant: CAMBRICON TECHNOLOGIES CORPORATION LIMITED, Beijing (CN)

(72) Inventors: Shaoli Liu, Beijing (CN); Tianshi Chen, Beijing (CN); Bingrui Wang, Beijing (CN); Yao Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/663,205

(22) Filed: Oct. 24, 2019

(65) Prior Publication Data

US 2020/0057650 A1     Feb. 20, 2020

Related U.S. Application Data

(63) Continuation of application No. 16/168,778, filed on Oct. 23, 2018, which is a continuation of application No. PCT/CN2017/099991, filed on Aug. 31, 2017.

(51) Int. Cl.
*G06F 9/38*        (2018.01)
*G06N 3/04*        (2006.01)
(Continued)

(52) U.S. Cl.
CPC .......... *G06F 9/3885* (2013.01); *G06F 9/3822* (2013.01); *G06K 9/00503* (2013.01);
(Continued)

(58) Field of Classification Search
CPC ...... G06F 9/3822; G06F 9/3885; G06F 17/16; G06N 3/0454; G06N 3/0481; G06N 3/063; G06N 3/04; G06N 3/06
See application file for complete search history.

(56) References Cited

U.S. PATENT DOCUMENTS 6,654,730 B1 * 11/2003 Kato ...................... G06N 3/063
                                                          706/15
7,737,994 B1 *  6/2010 Wasserman ............... G06T 1/20
                                                          345/615
(Continued)

FOREIGN PATENT DOCUMENTS

CN      103631761 A      3/2014
CN      104463324 A      3/2015
(Continued)

OTHER PUBLICATIONS

Song, L., Wang, Y., Han, Y., Zhao, X., Liu, B., & Li, X. (Jun. 2016). C-Brain: A deep learning accelerator that tames the diversity of CNNs through adaptive data-level parallelization. In Proceedings of the 53rd Annual Design Automation Conference (pp. 1-6). (Year: 2016).*

(Continued)

*Primary Examiner* — Michael J Huntley
*Assistant Examiner* — Oluwatosin O Alabi
(74) *Attorney, Agent, or Firm* — Bayes PLLC

(57) ABSTRACT

A fully connected operation method and a processing device for performing the same are provided. The fully connected operation method designates distribution data and broadcast data. The distribution data is divided into basic data blocks and distributed to parallel processing units, and the broadcast data is broadcasted to the parallel processing units. Operations between the basic data blocks and the broadcasted data are carried out by the parallel processing units before the results are returned to a main unit for further processing. The technical solutions disclosed by the present disclosure provide short Operation time and low energy consumption.

20 Claims, 9 Drawing Sheets

(51) Int. Cl.
*G06N 3/063* (2006.01)
*G06N 3/06* (2006.01)
*G06K 9/00* (2022.01)

(52) U.S. Cl.
CPC ............ *G06N 3/04* (2013.01); *G06N 3/0454* (2013.01); *G06N 3/0481* (2013.01); *G06N 3/06* (2013.01); *G06N 3/063* (2013.01)

(56) References Cited

U.S. PATENT DOCUMENTS

| | | | |
|---|---|---|---|
| 2008/0152217 A1* | 6/2008 | Greer ................... | G06K 9/6248 375/240 |
| 2016/0342888 A1 | 11/2016 | Yang et al. | |
| 2017/0316312 A1* | 11/2017 | Goyal ....................... | G06F 7/48 |
| 2017/0357891 A1 | 12/2017 | Judd et al. | |
| 2018/0046900 A1* | 2/2018 | Dally ...................... | G06F 17/11 |
| 2018/0157969 A1 | 6/2018 | Xie et al. | |
| 2018/0315158 A1 | 11/2018 | Nurvitadhi et al. | |
| 2019/0087716 A1 | 3/2019 | Du et al. | |
| 2019/0102671 A1* | 4/2019 | Cohen ....................... | G06N 3/08 |
| 2019/0114534 A1 | 4/2019 | Teng et al. | |

FOREIGN PATENT DOCUMENTS

| | | |
|---|---|---|
| CN | 104992430 A | 10/2015 |
| CN | 105426344 A | 3/2016 |
| CN | 105956659 A | 9/2016 |
| CN | 106126481 A | 11/2016 |
| CN | 106844294 A | 6/2017 |
| CN | 106940815 A | 7/2017 |
| CN | 106991476 A | 7/2017 |
| CN | 106991478 A | 7/2017 |
| JP | 2001188767 A | 7/2001 |
| KR | 10-2016-0140394 A | 12/2016 |
| WO | 2017/106469 A1 | 6/2017 |

OTHER PUBLICATIONS

Suda, N., Chandra, V., Dasika, G., Mohanty, A., Ma, Y., Vrudhula, S., . . . & Cao, Y. (Feb. 2016). Throughput-optimized OpenCL-based FPGA accelerator for large-scale convolutional neural networks. In Proceedings of the 2016 ACM/SIGDA International Symposium on Field-Programmable Gate Arrays (Year: 2016).*
Chellapilla, K., Puri, S., & Simard, P. (Oct. 2006). High performance convolutional neural networks for document processing. (Year: 2006).*
Pande, Anirud, and Rohit Chandna. "Matrix Convolution using Parallel Programming." International Journal of Science and Research 2.7 (2013): 286-291. (Year: 2013).*
Tsai, Y. M., Luszczek, P., Kurzak, J., & Dongarra, J. (Nov. 2016). Performance-portable autotuning of opencl kernels for convolutional layers of deep neural networks. In 2016 2nd Workshop on Machine Learning in HPC Environments (MLHPC) (pp. 9-18). IEEE. (Year: 2016).*
Parashar A, Rhu M, Mukkara A, Puglielli A, Venkatesan R, Khailany B, Emer J, Keckler SW, Dally WJ. Senn: An accelerator for compressed-sparse convolutional neural networks. ACM SIGARCH Computer Architecture News. Jun. 24, 2017;45(2):27-40. (Year: 2017).*
Mairal, J. (2016). End-to-end kernel learning with supervised convolutional kernel networks. arXiv preprint arXiv:1605.06265. (Year: 2016).*
Schlottmann, Craig R., and Paul E. Hasler. "A highly dense, low power, programmable analog vector-matrix multiplier: The FPAA implementation." IEEE Journal on emerging and selected topics in circuits and systems 1.3 (2011): 403-411. (Year: 2011).*
Huang H, Ni L, Wang K, Wang Y, Yu H. A highly parallel and energy efficient three-dimensional multilayer CMOS-RRAM accelerator for tensorized neural network. IEEE Transactions on Nanotechnology. Jul. 27, 2017;17(4):645-56. (Year: 2017).*
Ren A, Li Z, Ding C, Qiu Q, Wang Y, Li J, Qian X, Yuan B. Sc-dcnn: Highly-scalable deep convolutional neural network using stochastic computing. ACM SIGPLAN Notices. Apr. 4, 2017;52(4):405-18. (Year: 2017).*
Song L, Qian X, Li H, Chen Y. Pipelayer: A pipelined reram-based accelerator for deep learning. In2017 IEEE International Symposium on High Performance Computer Architecture (HPCA) Feb. 4, 2017 (pp. 541-552). IEEE. (Year: 2017).*
Colangelo, P., Luebbers, E., Huang, R., Margala, M., & Nealis, K. (Sep. 2017). Application of convolutional neural networks on Intel® Xeon® processor with integrated FPGA. In 2017 IEEE High Performance Extreme Computing Conference (HPEC) (pp. 1-7). IEEE. (Year: 2017).*
Extended European search report in related European Application No. 19211995.6, dated Apr. 6, 2020, 11 pages.
Jonghoon Jin et al: "Flattened Convolutional Neural Networks for Feedforward Acceleration", Arxiv.org, Nov. 20, 2015, 11 pages.
The Tensorflow Authors: "tensorflow/conv_grad_input_ops.cc at 19881 1c64d3139d52eb074fdf20c8156c42f9d0e tensorflow/tensorflow . GitHub", GitHub TensorFlow repository, Aug. 2, 2017, 21 pages.
Vincent Dumoulin et al:"A guide to convolution arithmetic for deep learning", arxiv.org, Cornell University Library, 201 Olin Library Cornell University Ithaca, NY 14853, Mar. 23, 2016, 28 pages.
Extended European search report in related European Application No. 19212002.0, dated Apr. 8, 2020, 11 pages.
Minsik Cho et al: "MEC: Memory-efficient Convolution for Deep Neural Network", arxiv.org, Cornell University Library, 201 Olin Library Cornell University Ithaca, NY 14853, Jun. 21, 2017, 10 pages.
Extended European search report in related European Application No. 19212010.3, dated Apr. 20, 2020, 9 pages.
Extended European search report in related European Application No. 19212365.1, dated Apr. 21, 2020, 10 pages.
Extended European search report in related European Application No. 19212368.5, dated Apr. 22, 2020, 10 pages.
Yunji Chen, "DaDianNao: Machine-Learning Supercomputer" (2014 47th Annual IEEE/ACM International Symposium on Microarchitecture» , Jan. 19, 2015, 15 pages.
Liu, Shaoli et al., "Cambricon: An Instruction Set Architecture for Neural Networks", IEEE Computer Society, 2016 ACM/IEEE 43rd Annual International Symposium on Computer Architecture, 13 pages.
Zhang, Shijin et al., "Cambricon-X: An Accelerator for Sparse Neural Networks", 978-1-5090-3/16/$31.00, 2016 IEEE, 12 pages.
Chen, Yunji et al., "DaDianNao: A Machine-Learning Supercomputer", IEEE Computer Society, 2014 47th Annual IEEE/ACM International Symposium on Microarchitecture, 14 pages.
Chen, Tianshi et al., "DianNao: A Small-Footprint High-Throughput Accelerator for Ubiquitous Machine-Learning", ASPLOS '14, Mar. 1-5, 2014, Salt Lake City, Utah, USA, 15 pages.
Chen, Yunji et al., "DianNao Family: Energy-Efficient Hardware Accelerators for Machine Learning", DOI:10.1145/2996864, Nov. 2016, vol. 59, No. 11, Communications of the ACM, 8 pages.
Liu, Daofu et al., "PuDianNao: A Polyvalent Machine Learning Accelerator", ASPLOS '15, Mar. 14-18, 2015, Istanbul, Turkey, 13 pages.
Du, Zidong et al., "ShiDianNao: Shifting Vision Processing Closer to the Sensor", ISCA '15, Jun. 13-17, 2015, Portland, OR, USA, 13 pages.
Lili Song et al., "C-Brain:A Deep Learning Accelerator that Tames the Diversity of CNNs through Adaptive Data-level Parallelization" Proceedings of the 53rd ACM/EDAC/IEEE Design Automation Conference, US IEEE, Jun. 5, 2016, pp. 1-6.
Yu Wang et al, "Low Power Convolutional Neural Networks on a Chip", 2016 IEEE International Symposium on Circuits and Systems(ISCAS), IEEE, May 22, 2016, pp. 129-132, XP32941496A.
Office Action issued in related European Application No. 19211995. 6, dated Dec. 8, 2021, 11 pages.

(56) References Cited

OTHER PUBLICATIONS

Office Action issued in related Korean Application No. 10-2019-7029020, dated Feb. 26, 2022, 11 pages, Last five pages not considered.

* cited by examiner

PROCESSING DEVICE AND RELATED PRODUCTS

CROSS REFERENCE TO RELATED APPLICATION

The present application is a continuation application of U.S. application Ser. No. 16/168,778, filed on Oct. 23, 2018, which is a continuation application of International Application No. PCT/CN2017/099991, filed Aug. 31, 2017, both of which are incorporated herein by reference in their entireties.

TECHNICAL FIELD

The present disclosure relates to the field of communication and chip technology, and particularly relates to a processing device and related products for performing fully-connected operations.

BACKGROUND

Artificial neural networks (ANN) have been a research hotspot prompted since the 1980s. An ANN abstracts human brain neural networks from the perspective of information processing to establish a simple model and form different networks according to different connection modes. It is also often referred to as a neural network or a neural-like network in engineering and academia. A neural network is an operation model consisting of a larger number of interconnected nodes (or neurons). Operations of the existing neural networks are performed based on a central processing unit (CPU) or a graphic processing unit (GPU), and the operations consume high power and long operation time.

SUMMARY

The embodiments of the present disclosure provide a method for operations in a neural network and related products, which can reduce operation time and decrease power consumption of the module.

According to a first aspect of the present disclosure, a processing device and related products are disclosed. The processing device includes a main processing circuit and a plurality of basic processing circuits. The main processing circuit is configured to receive input data, a weight, and instructions for performing a fully connected operation and designate one of the input data and the weight as distribution data and the other one as broadcasting data. The main processing circuit is further configured to divide the distribution data into a plurality of basic data blocks, distribute the basic data blocks to the plurality of basic processing circuits, and broadcast the broadcasting data to the plurality of basic processing circuits. The plurality of basic processing circuits are configured to perform inner-product operations in parallel on the basic data blocks and the broadcasting data according to the instructions to obtain a plurality of processing results, and provide the plurality of processing results to the main processing circuit. The main processing circuit is further configured to combine the plurality of processing results according to the instructions to obtain a computation result.

According to a second aspect of the present disclosure, a fully connected operation method performed by a processing device is disclosed. The processing device includes a main processing circuit and a plurality of basic processing circuits. The method includes receiving, by the main processing circuit, input data, a weight, and instructions for performing a fully connected operation. The method further includes designating, by the main processing circuit, one of the input data and the weight as distribution data and the other one as broadcasting data. The method yet further includes dividing, by the main processing circuit, the distribution data into a plurality of basic data blocks, and distributing, by the main processing circuit, the basic data blocks to the plurality of basic processing circuits. The method yet further includes broadcasting, by the main processing circuit, the broadcasting data to the plurality of basic processing circuits. The method also includes performing, by the plurality of basic processing circuits, inner-product operations in parallel on the basic data blocks and the broadcasting data according to the instructions to obtain a plurality of processing results, and providing, by the plurality of basic processing circuits, the plurality of processing results to the main processing circuit. The method additionally includes combining, by the main processing circuit, the plurality of processing results according to the instructions to obtain a computation result.

The embodiments of the present disclosure have the following beneficial effects. In the embodiments of the present disclosure, the received data is designated as distribution data and broadcast data respectively. The distribution data block is divided into the plurality of basic data blocks, and then the plurality of basic data blocks are distributed to the plurality of basic processing circuits to perform inner-product operations. In this way, the largest amount of calculation in the inner product operations is distributed to the plurality of basic processing circuits for simultaneous/parallel execution, thereby reducing calculation time and saving power consumption.

DETAILED DESCRIPTION

Figure 1A:
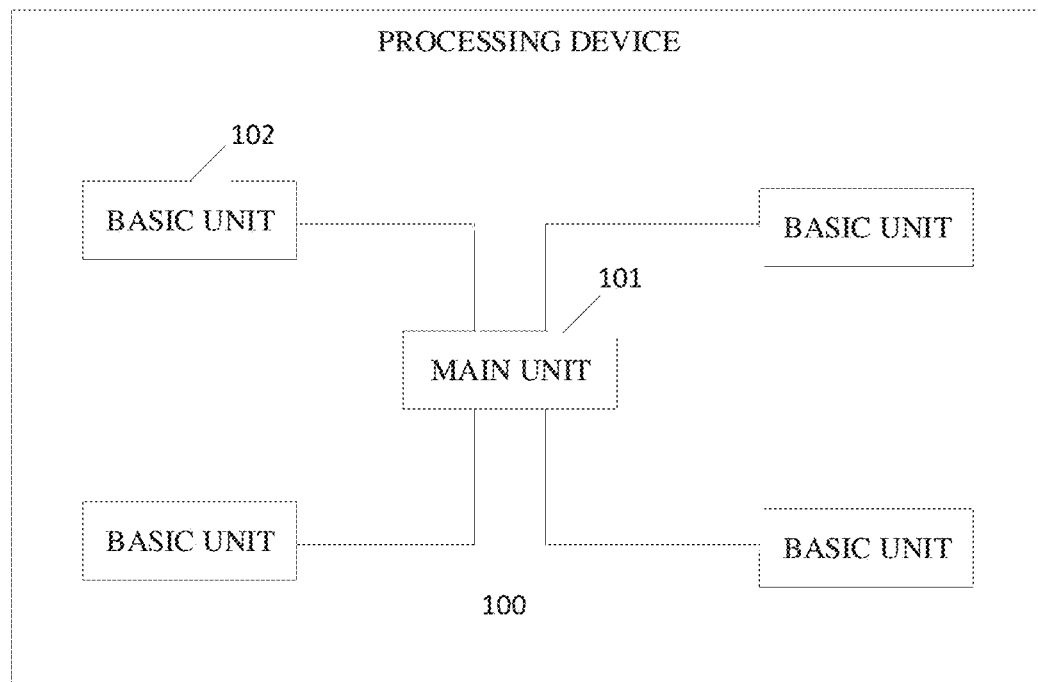
FIG. 1a is a schematic structural diagram of a processing device according to one embodiment of the present disclosure.

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

The terms such as "first", "second", "third", and "fourth" used in the specification, the claims, and the accompanying drawings of the present disclosure are used for distinguishing between different objects rather than describing a particular order. The terms "include" and "comprise" as well as variations thereof are intended to cover non-exclusive inclusion. For example, a process, method, system, product, device, or apparatus including a series of steps or units is not limited to the listed steps or units, it can optionally include other steps or units that are not listed; alternatively, other steps or units inherent to the process, method, product, or device can be included either.

The term "embodiment" referred to herein means that a particular feature, structure, or feature described in conjunction with the embodiment may be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

The following describes a CPU as an example to illustrate an operation in a neural network. Matrix multiplication is widely used in the neural network, and in the embodiments of the present disclosure, a multiplication of a matrix A and a matrix B is described as an example to illustrate an AND operation in the CPU, Assuming that a multiplication result of the matrix A and the matrix B is a matrix C, i.e., C=A*B, the multiplication operation is illustrated below.

$$C = \begin{bmatrix} a_{11} & a_{12} & a_{13} \\ a_{21} & a_{22} & a_{23} \\ a_{31} & a_{32} & a_{33} \end{bmatrix} * \begin{bmatrix} b_{11} & b_{12} & b_{13} \\ b_{21} & b_{22} & b_{23} \\ b_{31} & b_{32} & b_{33} \end{bmatrix}$$

For the CPU, the matrix C can be calculated as follows. Multiplication calculation may be sequentially performed for the first line, the second line, and the third line, in other words, after the multiplication calculation for a line is completed, the multiplication calculation for another line can be performed. Taking the above formula as an example, the multiplication calculation for the first line is first performed and completed, by the CPU, to obtain results of $a_{11}*b_{11}+a_{12}*b_{21}+a_{13}*b_{31}+a_{11}*b_{12}+a_{12}*b_{22}+a_{13}*b_{32}$, and $a_{11}*b_{13}+a_{12}*b_{23}+a_{13}*b_{33}+$, and then the multiplication calculation for the second line is performed and completed to obtain results of $a_{21}*b_{11}+a_{22}*b_{21}+a_{23}*b_{31}+a_{21}*b_{12}+a_{22}*b_{22}+a_{23}*b_{32}$, and $a_{21}*b_{13}+a_{22}*b_{23}+a_{23}*b_{33}+$, and the multiplication calculation for the third line is finally performed and completed to obtain results of $a_{31}*b_{11}+a_{32}*b_{21}+a_{33}*b_{31}+a_{31}*b_{12}+a_{32}*b_{22}+a_{33}*b_{32}$, and $a_{31}*b_{13}+a_{32}*b_{23}+a_{33}*b_{33}+$.

Therefore, for a CPU or a GPU, it needs to perform calculations line by line, that is, after a calculation operation for the first line is completed, a calculation operation for the second line is performed, and then a calculation operation for the third line is performed until calculation operations for all lines has been completed. A neural network may include thousands of rows to be calculated, such that a calculation operation for the neural network may cost a long period of time. During the calculation operation for the neural network, the CPU is constantly in operation state with high energy consumption.

FIG. 1a is a schematic structural diagram of a processing device 100. Consistent with this disclosure, a "processing device" may be interchangeably referred as a "chip device." Processing device 100 includes a main unit 101 and a plurality of basic units 102, and main unit 101 is connected to the plurality of basic units 102 respectively. Referring to a structure illustrated in FIG. 1a, since each of the basic units is directly and physically connected with the main unit, the number of basic units connected to the structure is limited, which is suitable for simple data calculation only. In some embodiments, both main unit 101 and basic units 102 are hardware units. For example, main unit 101 may be a main processing circuit and basic units 102 may be basic processing circuits.

Figure 1B:
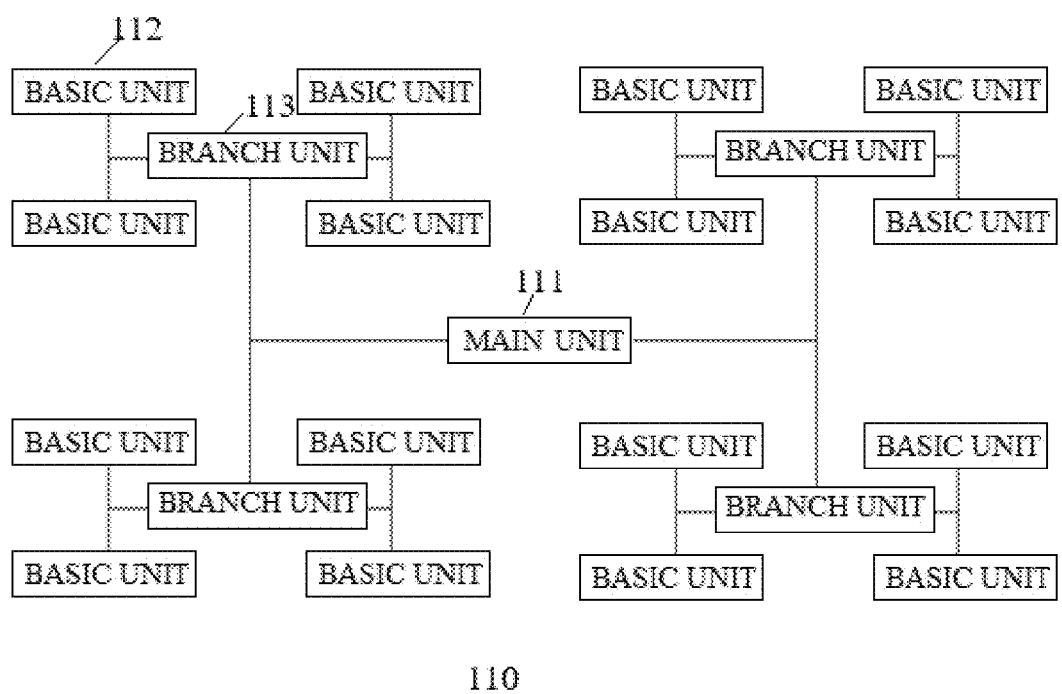
FIG. 1b is a schematic structural diagram of another processing device according to one embodiment of the present disclosure.

FIG. 1b is a schematic structural diagram of a processing device 110. As illustrated in FIG. 1b, the processing device includes main unit 111, a plurality of basic units 112, and branch units 113. Main unit 111 and basic units 112 are similar to main unit 101 and basic units 102. Branch units 113 are also hardware units, such as branch processing circuits. Main unit 111 may include at least one of a register and an on-chip cache circuit, and may further include a vector arithmetic unit circuit, an arithmetic and logic unit (ALU) circuit, an accumulator circuit, and a direct memory access (DMA) circuit. In practical applications, main unit 111 may further include a conversion circuit (for example, a matrix transposition circuit), a data rearrangement circuit, an activation circuit, and the like.

Each of basic units 112 may include at least one of a basic register and a basic on-chip cache circuit, and may further include one or any combination of an inner-product arithmetic unit circuit, a vector arithmetic unit circuit, an accumulator circuit, and the like. Each of the above-mentioned circuits can be an integrated circuit. In an embodiment, the processing device is provided with branch units 112, main unit 111 is coupled with branch units 113, and each of branch units 113 is connected to a corresponding basic unit 112. Basic unit 112 is configured to perform an inner-product operation between data blocks. Main unit 111 is configured to receive and transmit external data, and to distribute the external data to branch units 113. Branch unit 113 is configured to receive and transmit data from main unit 111 or basic unit 112. The structure of the processing device illustrated in FIG. 1b is applicable for calculations of complex data. Since the number of units connected to main unit 111 is limited, it is necessary to add branch units 113 between main unit 111 and basic units 112 to provide accesses for more basic units 112, so as to achieve calculations of complex data blocks.

Branch unit 113 and basic unit 112 may be connected by any type of connection structure. Which is not limited to an H-type structure illustrated in FIG. 1b. In one embodiment, data from the main unit may be broadcasted or distributed to basic units 112 and data from a basic unit 112 may be gathered to main unit 111. That is, data may be transmitted in a broadcast manner, a distribution manner, and a gather manner, which are described in detail as follows.

A data transfer manner of main unit 111 to basic unit 112 may include the follows.

In one embodiment, main unit 111 is connected with multiple branch units 112 respectively, and each of branch units 112 is connected with multiple basic units respectively.

In another embodiment, main unit 111 is connected with a branch unit 112, and branch unit 112 is connected with another branch unit 112. Accordingly, multiple branch units 112 are connected in series, and then, each of the multiple branch units 112 is connected with multiple basic units 112 respectively.

In yet another embodiment, main unit 111 is connected with each of multiple basic units 112 respectively, and each branch unit 113 is connected in series with multiple basic units 112.

In still another embodiment, main unit 111 is connected with a branch unit 113, and branch unit 113 is connected with another branch unit 113. Accordingly, multiple branch units 113 are connected in series, and then, each of the multiple branch units 113 is connected with multiple basic units 112 in series.

When distributing data, the main unit transmits data to some or all of basic units 112, and data received by each of basic units 112 may be different.

When broadcasting data, the main unit transmits data to some or all of basic units 112, and data received by each of basic units 112 is the same.

When gathering data, some or all of basic units 112 transmit data to the main unit. It should be noted that processing device 100/110 illustrated in FIG. 1a or FIG. 1b may be a single physical chip. In practical applications, the processing device may also be integrated in another chip (such as a CPU, a GPU). The specific embodiments in the present disclosure do not limit the physical representation of the above-mentioned processing device.

Figure 1C:
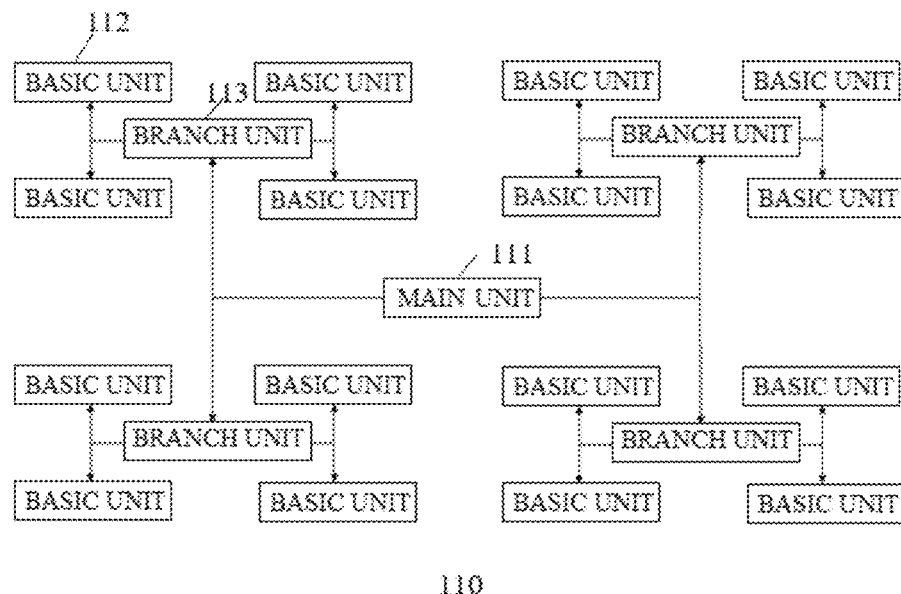
FIG. 1c is a schematic diagram illustrating data distribution in a processing device according to one embodiment of the present disclosure.

FIG. 1c is a schematic diagram illustrating data distribution of a processing device 110. As illustrated by arrows in FIG. 1c, the arrows indicate a distribution direction of the data. As illustrated in FIG. 1c, after receiving external data, the external data is split and distributed, by main unit 111, to multiple branch units 113, and then the multiple branch units 113 transmit the data split to basic units 112.

Figure 1D:
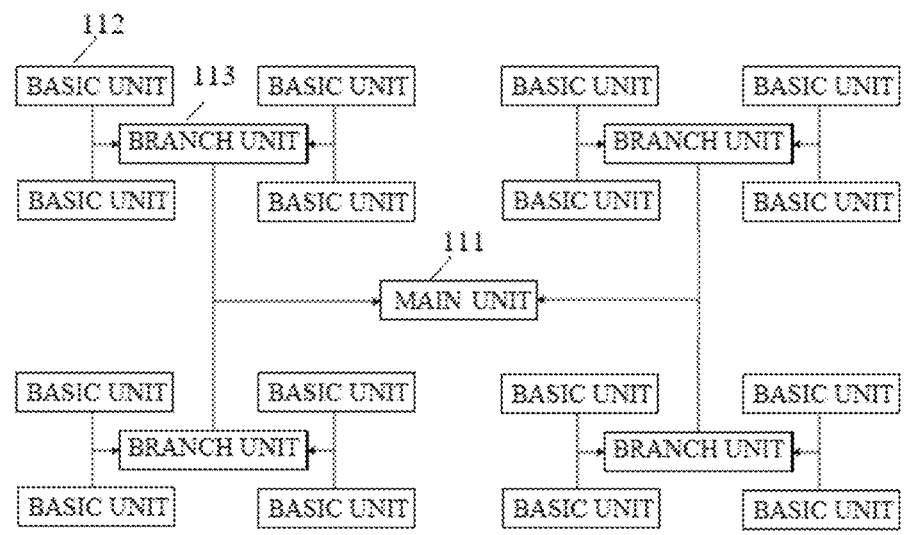
FIG. 1d is a schematic diagram illustrating data return in a processing device according to one embodiment of the present disclosure.

FIG. 1d is a schematic diagram illustrating data return of a processing device 110. As illustrated by arrows in FIG. 1d, which indicate a return path of the data. As illustrated in FIG. 1d, basic units 112 return data (for example, an inner-product operation result) to branch units 113, and then branch units 113 return the data to main unit 111.

Figure 2A:
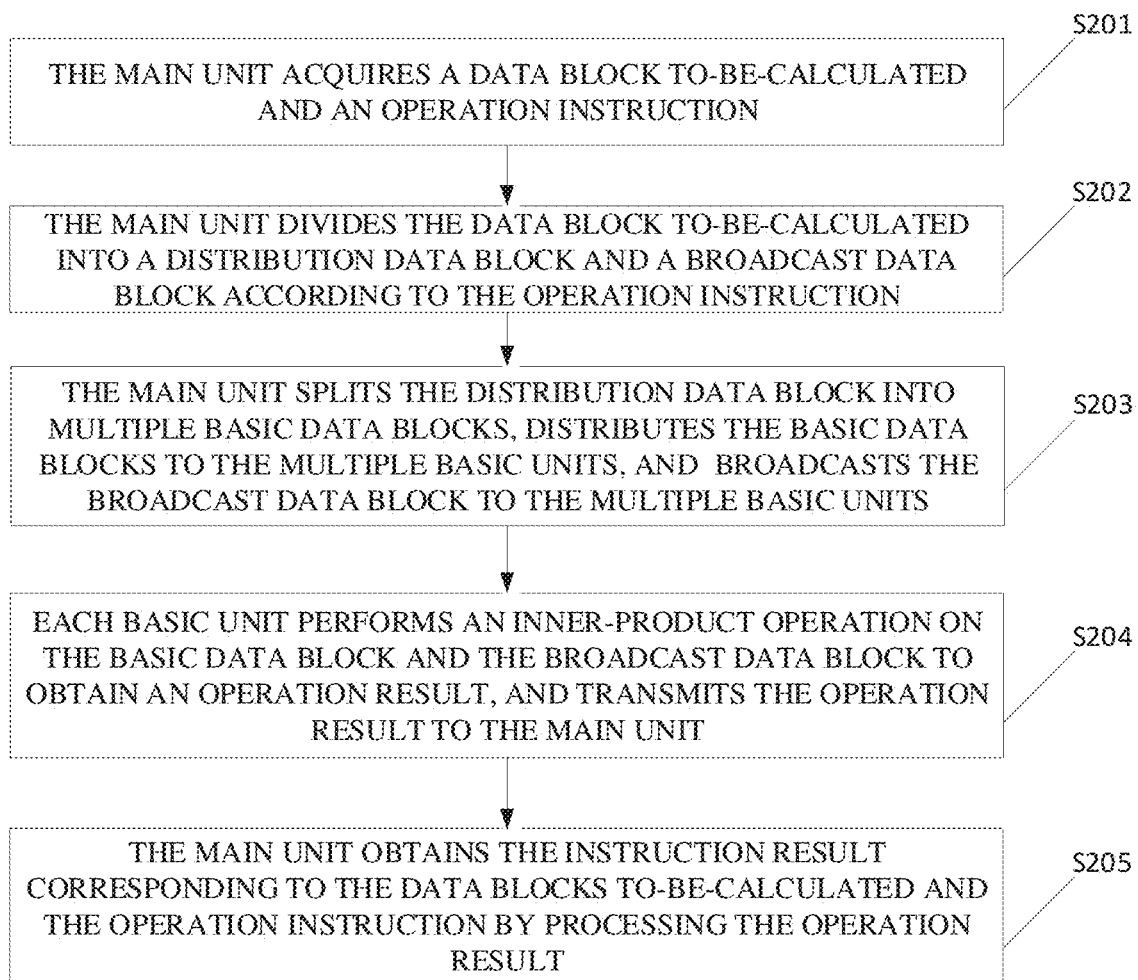
FIG. 2a is a flow chart illustrating a method for performing operations of a neural network according to one embodiment of the present disclosure.

As illustrated in FIG. 2a, a method for operations in a neural network by using the above-mentioned processing device is provided. The method is implemented by using a processing device illustrated in FIG. 1a or FIG. 1b. As illustrated in FIG. 2a, the method includes the following.

At S201, the main unit of the processing device may acquire a data block to-be-calculated and an operation instruction.

The data block to-be-calculated at S201 may be a matrix, a vector, a three-dimensional data, a four-dimensional data, a multi-dimensional data, and the like. The form of the data block to-be-calculated is not limited in the embodiments of the present disclosure. The operation instruction may be a multiplication instruction, a convolution instruction, an addition instruction, a subtraction instruction, a Basic Linear Algebra Subprograms (BLAS) function, an activation function, or the like.

At S202, the main unit may divide the data block to-be-calculated into a distribution data block and a broadcast data block according to the operation instruction.

The S202 may be implemented as follows.

When the operation instruction is a multiplication instruction, a multiplier data block is determined to be the broadcast data block, and a multiplicand data block is determined to be the distribution data block.

When the operation instruction is a convolution instruction, an input data block is determined to be the broadcast data block, and a convolution kernel is determined to be the distribution data block.

Operations at S203 may include operations at S2031 and S2032.

At S2031, the main unit may split the distribution data block into multiple basic data blocks, and distribute the basic data blocks to the multiple basic units.

At S2032, the main unit may broadcast the broadcast data block to the multiple basic units.

In one embodiment, the operations at S2031 and S2032 may also be performed cyclically. In a case that there is a large amount of data-to-be-calculated, the main unit may split the distribution data block into multiple basic data blocks and split each of the multiple basic data blocks into in basic data sub-blocks, and split the broadcast data block into m broadcast data sub-blocks. The main unit may distribute one basic data sub-block of each basic data block and broadcast one broadcast data sub-block each time. The basic data sub-block and the broadcast data sub-block are data blocks capable of performing parallel neural network computations. Take a multiplication of a matrix B of size 1000*1000 and a matrix A of size 1000*1000 as an example. A basic data block may be $z^{th}$ row data of the matrix A, and a basic data sub-block may be the first 20 columns of data in the $z^{th}$ row data of the matrix A, the broadcast data sub-block may be the first 20 rows of data in the $z^{th}$ column data of matrix B.

The basic data block at S203 may be a minimum data block capable of performing an inner-product operation. In a matrix multiplication, for example, the basic data block may be a row of data of a matrix. For example, in a convolution operation, the basic data block may be the weight of a convolution kernel.

A manner for distributing data blocks at S203 may refer to the description of the following embodiments, and details are not described herein again. The reference of a manner for broadcasting the broadcast data block may be made in the description of the following embodiments, and details are not described herein again.

Operations at S204 may include operations of S2041 and S2042.

At S2041, the basic unit of the processing device may perform an inner-product operation on the basic data block and the broadcast data block to obtain an operation result (alternatively, may obtain an intermediate result).

At S2042, when the operation result is not an intermediate result, the operation result may be transmitted to the main unit in a return manner.

The return manner at S204 may refer to the description of the following embodiments, and details are not described herein again.

At S205, the main unit may obtain the instruction result corresponding to the data blocks to-be-calculated and the operation instruction by processing the operation result.

A processing manner at S205 may be an accumulation operation, a sort algorithm, or the like. The present disclosure is not limited to a specific processing manner. The specific processing manner needs to be configured according to different operation instructions, for example, may also include a nonlinear transformation or the like.

In technical solutions provided by the present disclosure, when performing an operation, the main unit may perform the following operations. External data including a data block to-be-calculated and an operation instruction may be received, and the data block to-be-calculated and the operation instruction may then be acquired. A distribution data block and a broadcast data block of the data block to-be-calculated may be determined according to the operation instruction. The distribution data block may be split into multiple basic data blocks. The broadcast data block may broadcast to the multiple basic units. The multiple basic data blocks may be distributed to the multiple basic units. The multiple basic units may respectively perform inner-product operations for the multiple basic data blocks and the broadcast data block to obtain operation results, and return the operation results to the main unit. The main unit obtains the instruction result of the operation instruction according to the operation results returned. The technical point of this technical solution can be illustrated as follows. For a neural network, inner-product operations between data blocks need large amounts of calculations, resulting in a larger computational overhead and a longer period of calculation time. Therefore, the embodiments of the present disclosure first distinguish a distribution data block and a broadcast data block in data blocks to-be-calculated according to an operation instruction and the data blocks to-be-calculated. The broadcast data block is a data block that must be used when implementing an inner-product operation, and the distribution data block can be split in the inner-product operation. Taking a matrix multiplication as an example, the data block to-be-calculated may include a matrix A and a matrix B. An operation instruction can be a multiplication instruction (A*B). According to the rule of matrix multiplication, the matrix A is determined as the distribution data block subject to split, and the matrix B is determined as the broadcast data block. For the matrix multiplication, the multiplicand matrix A can be split into multiple basic data blocks, and the multiplier matrix B can be a broadcast data block. According to the definition of the matrix multiplication, data of each line of the multiplicand matrix A is subject to inner-product operations with the multiplier matrix B. Therefore, in technical solutions of the present application, the matrix A may be divided into M basic data blocks, and each of the M basic data blocks may be a row of data of the matrix A. Thus, for matrix multiplication, a time-consuming operation is performed by multiple basic units individually, such that in an inner-product operation, the multiple basic units can quickly calculate the operation results in parallel to reduce calculation time. In addition, less calculation time can also reduce the operating time duration of the processing device, thereby reducing power consumption.

Figure 2B:
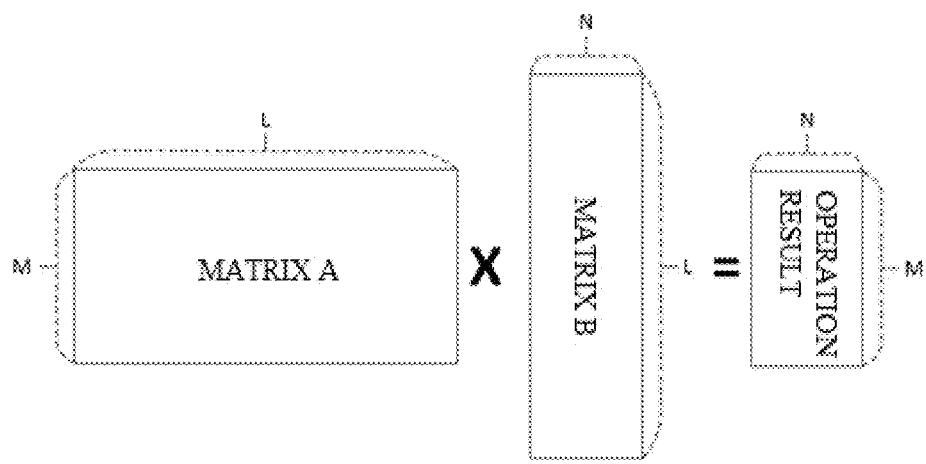
FIG. 2b is a schematic diagram illustrating a multiplication operation between a matrix A and a matrix B according to one embodiment of the present disclosure.

The effects of the technical solutions provided by the present disclosure will be described below by practical examples. FIG. 2b is a schematic diagram illustrating a multiplication operation for a matrix A and a vector B. As illustrated in FIG. 2b, the matrix A has M rows and L columns, the vector B has L rows. Assume that a time duration required for the inner-product operation of one row of the matrix A and the vector B is t1. When a CPU or a GPU is employed to perform operations, only after a calculation operation for a line is completed, a calculation operation can be performed for another. Therefore, a time duration T0 of a calculation operation for the above-mentioned matrix A and the vector B by a GPU or a CPU will be M*t1. With technical solutions provided by the embodiments of the present disclosure, assume that the number of basic units is M, the matrix A will be split into M basic data blocks, and each basic data block can be a row of data of the matrix A. The M basic units can simultaneously perform inner-product operations in parallel, and then the calculation time duration is t1. In the technical solutions provided by the embodiments of the present disclosure, the time duration required T1 can be a sum of t1, t2, and t3, where t2 is a time duration required for the main unit to split data, and t3 is a time duration required for processing the operation results of the inner-product operations to obtain an instruction result. The calculation amount required for splitting data and processing operation results are very-small, and therefore, the time consumption is very small, that is, T0>>T1, and the total calculation time duration can be significant reduced in the technical solutions of the embodiments of the present disclosure. Moreover, as for the power consumption generated during processing the data to-be-calculated, the operating time duration of processing device provided by the present disclosure can be particularly short due to T0>>T1. Experiments have illustrated that when the operating time duration of the processing device is very short, the energy consumption will be much lower than the energy consumption of long operating time duration, thereby reducing energy consumption.

In the foregoing operations at S203, the main unit may broadcast the broadcast data block to the multiple basic units in multiple implementation manners, which may specifically be described as follows.

In a method A, the broadcast data block is broadcast to multiple basic units by one time. The term "broadcast" refers to performing "one-to-many" data transmission, that is, the main unit simultaneously sends the same data block to multiple (all or part of) basic units. For example, in a matrix multiplication between a matrix A and a matrix B, where the matrix B is implemented as a broadcast data block, the matrix B will be broadcast to the multiple basic units. For another example, in a convolution operation, the input data block is implemented as a broadcast data block, and the input data block will be broadcast to multiple basic units at one time. The advantage of the method A is that data transmission amount between the main unit and the multiple basic units can be saved by transmitting all the broadcast data to multiple basic units via only one broadcast.

In a method B, the broadcast data block is divided into multiple broadcast data sub-blocks, and the multiple broadcast data sub-blocks will be broadcast to multiple basic units by multiple times. For example, the matrix B may be broadcast to the multiple basic units by multiple times. Specifically, each N columns of data of the matrix B may be broadcast each time. The advantage of the method B is that configuration requirements of the multiple basic units can be decreased. Normally, a storage space of a register of a basic unit is relatively small, when the matrix B with a large amount of data is sent to the basic unit at one time, then a larger register space of the basic unit for storing the data of the matrix B will be needed. Since there are a lame number of the basic units in the processing device, an increase of the register space of each of the basic units will inevitably increase the cost of the processing device. Therefore, in this case, the broadcast data block is broadcasted to the basic units in multiple times, such that the basic unit only needs to store a part of the data of the broadcast data block each time, thereby reducing the cost of the processing device.

It should be noted that, the method for distributing multiple basic data blocks to multiple basic units at S203, may also adopt the method A or the method B. The only difference is that the transmission method is unicast and the transmitted data is the multiple basic data blocks.

Operations at S204 may be implemented as follows.

Figure 4A:
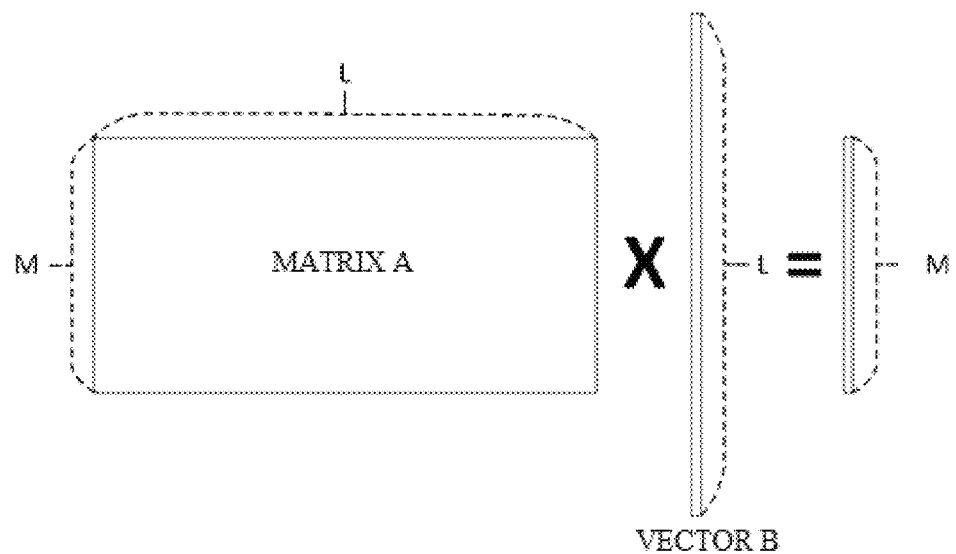
FIG. 4a is a schematic diagram illustrating single-sample input data of a fully connected layer.

When the method A is adopted to broadcast the broadcast data block and to distribute basic data block (as illustrated in FIG. 4a), the basic unit may perform inner-product operations to the basic data block and the broadcast data block to obtain an inner-product processing result. That is to perform an inner-product operation for one line at one time, and to transmit the inner-product processing result (one kind of the operation results) to the main unit, and the main unit accumulates the inner-product processing result. In practical applications, the basic unit may accumulate the inner-product processing result and transmit an accumulated result (another kind of the operation results) to the main unit. The above-mentioned method can reduce the amount of data transmission between the main unit and the basic unit, thereby improving calculation speed.

When the method B is adopted to broadcast the broadcast data block, the basic unit may perform an inner-product operation for a basic data block and a broadcast data sub-block to obtain an operation sub-result when receiving the broadcast data sub-block. The operation sub-result may be sent to the main unit by the basic unit, and the main unit performs accumulation operation for the processing result. In another embodiment, when the basic unit receives n basic data blocks, n operation sub-results may be obtained by multiplexing the broadcast data block to perform inner-product operation with the n basic data blocks. The basic unit may send the n operation sub-results to the main unit, and the main unit may perform accumulation Operation for the n processing results. The above accumulation operation can also be performed by the basic unit.

In the above case, the amount of data of the broadcast data block is generally very large, as well as the distribution data block. The processing device is a kind of a hardware configuration, the basic units of the processing device may be innumerable in theory. However, in practice, the number of the basic units may be generally several tens, which is limited and may change (such as increase) constantly with technology development. Therefore, as for the matrix multiplication operations in the neural network, the matrix A may have thousands of rows, and the matrix B may also have thousands of columns, such that it is impossible to transmit the matrix B to the basic unit at one time. Accordingly, an exemplary method may be performed as follows, A part of the data of the matrix B (for example, the first five columns of the matrix B), may be broadcast to the basic units at each time. A similar exemplary method may be adopted for the matrix A. The basic unit may perform an inner-product sub-operation each time, and then, a result of the inner-product sub-operation can be stored in the register, and after all the inner-product operations of the row are executed, an operation result may be obtained by performing an accumulation operation for all results of the inner-product operations of the row. The operation result obtained may be sent to the main unit, thereby improving calculation speed.

Figure 3:
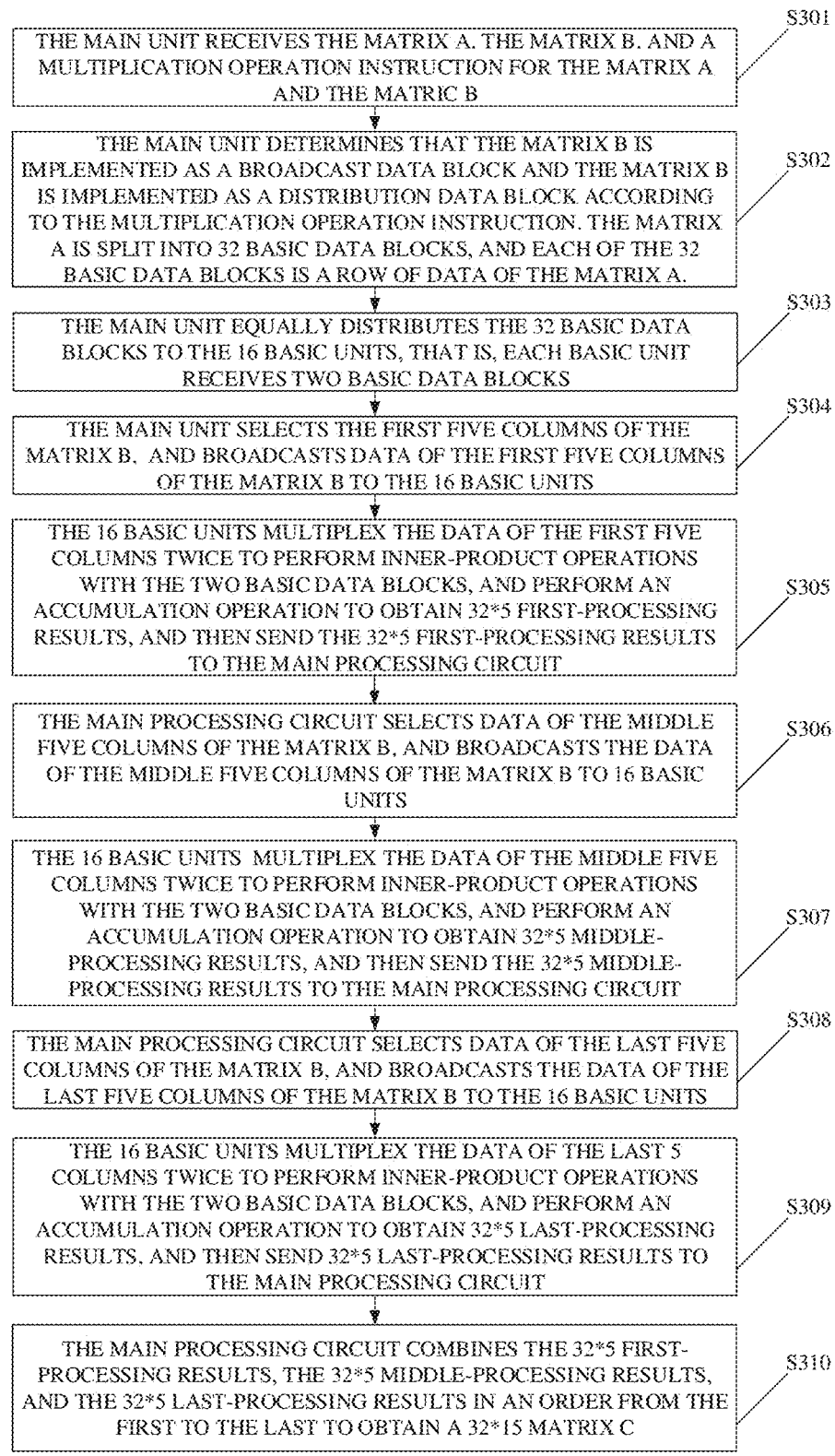
FIG. 3 is a flow chart illustrating another method for performing operations of a neural network according to one embodiment of the present disclosure.

Referring to FIG. 3, a method for performing operations in a neural network is provided. The embodiments of the present disclosure describe a matrix multiplication of a matrix A and a matrix B as an example. The matrix multiplication of the matrix A and the matrix B is illustrated in FIG. 2b. For convenience of illustration, the calculation method of the neural network illustrated in FIG. 3 is performed in the processing device illustrated in FIG. 1b. As illustrated in FIG. 1b, the processing device is provided with 16 basic units. For convenience of description and distribution, the value of M as illustrated in FIG. 4a is 32, the value of N is 15, and the value of L is 20. It should be understood that the processing device may have any number of basic units. The method illustrated in FIG. 3 may include the following.

At S301, the main unit may receive the matrix A, the matrix B, and a multiplication operation instruction for the matrix A and the matric B.

At S302, the main unit may determine that the matrix B is implemented as a broadcast data block and the matrix B is implemented as a distribution data block according to the multiplication operation instruction. The matrix A is split into 32 basic data blocks, and each of the 32 basic data blocks is a row of data of the matrix A.

At S303, the main unit may equally distribute the 32 basic data blocks to the 16 basic units, that is, each basic unit receives two basic data blocks. It should be noted that, the basic data blocks may be distributed non-repetitively in an arbitrary order.

The basic data blocks at S303 may be distributed in other manners. For example, when the basic data blocks cannot be distributed equally to each basic unit, then the basic data blocks may be distributed to each basic unit unequally. A data block that cannot be equally distributed to the basic units, may be first split into several parts, and then the several parts may be equally distributed to the basic units. The manner in which the basic data blocks are distributed to multiple basic units is not limited in the embodiments of the present disclosure.

At S304, the main unit may select the first few columns of the matrix B (such as the first five columns, for the convenience of description, the following takes multiple groups of five columns of the matrix B as an example), and broadcast data of the first five columns of the matrix B to the 16 basic units.

At S305, the 16 basic units may multiplex the data of the first five columns twice to perform inner-product operations with the two basic data blocks, and perform an accumulation operation to obtain 32*5 first-processing results, and then send the 32*5 first-processing results to the main unit.

At S306, the main unit may select data of the middle five columns of the matrix B, and broadcast the data of the middle five columns of the matrix B to 16 basic units.

At S307, the 16 basic units may multiplex the data of the middle five columns twice to perform inner-product operations with the two basic data blocks, and perform an accumulation operation to obtain 32*5 middle-processing results, and then send the 32*5 middle-processing results to the main unit.

At S308, the main unit may select data of the last five columns of the matrix B, and broadcast the data of the last five columns of the matrix B to the 16 basic units.

At S309, the 16 basic units may multiplex the data of the last 5 columns twice to perform inner-product operations with the two basic data blocks, and perform an accumulation operation to obtain 32*5 last-processing results, and then send 32*5 last-processing results to the main unit.

At S310, the main unit may combine the 32*5 first-processing results, the 32*5 middle-processing results, and the 32*5 last-processing results in an order from the first to the last to obtain a 32*15 matrix C. The matrix C is an instruction result of the multiplication operation instruction A*B.

It should be noted that, in this embodiment, the 15 columns of the matrix B are exemplarily split into the first five columns, the middle five columns, and the last five columns. In other embodiments, the matrix B can also be flexibly split according to specific conditions.

Figure 4B:
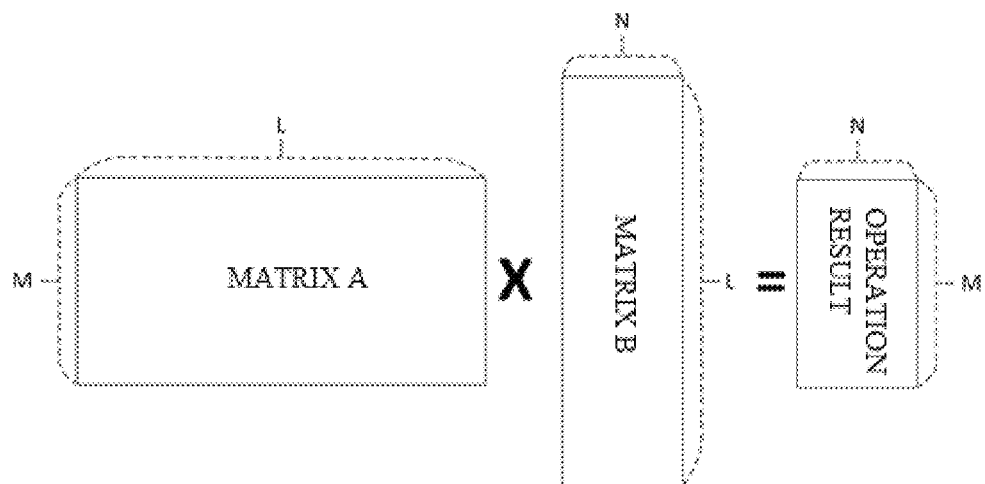
FIG. 4b is a schematic diagram illustrating multiple-sample input data of a fully connected layer.

In the example of FIG. 4b, the matrix A is split into 32 basic data blocks, and then the matrix B may be broadcast in batches, such that the basic unit can obtain instruction results in batches. Since an inner-product operation is split and calculated by 16 basics units, the calculation time duration can be greatly reduced, which has advantages of short calculation time and low energy consumption.

In some embodiments, a processing device is provided by the disclosure. As shown in FIG. 1a and FIG. 1b, the processing device includes a main unit and a plurality of basic units. The main unit is a hardware chip unit, and the plurality of basic units are also hardware chip units.

The main unit is configured to perform a set of operations in a neural network in series and to transmit data to the basic units.

The basic units are configured to perform a set of operations in parallel in the neural network according to the data transmitted by the main unit, and to transmit operation results to the main unit.

The above-mentioned parallel operations may include, but are not limited to, large-scale and parallelizable operations such as multiplication operations between data blocks, convolution operations, and the like.

The above-mentioned operation includes, but is not limited to, accumulation operation, matrix transposition operation, data sorting operation, and the like.

In one embodiment, the main unit is configured to obtain a data block to-be-calculated and an operation instruction, to divide the data block to-be-calculated into a distribution data block and a broadcast data block according to the operation instruction, to obtain a plurality of basic data blocks by splitting the distribution data block, and to distribute the plurality of basic data blocks to the basic units and broadcast the broadcast data block to the basic units. The basic units are configured to obtain operation results by performing inner-product operations for the basic data blocks and the broadcast data block and to send the operation results to the main unit. The main unit is further configured to obtain an instruction result corresponding to the data block to-be-calculated and the operation instruction by processing the operation results.

In one embodiment, the processing device further includes a branch unit disposed between the main unit and at least one basic unit. The branch unit is configured to forward data between the main unit and the at least one basic unit.

In one embodiment, the main unit is further configured to broadcast the broadcast data block to multiple basic units by one broadcast.

In one embodiment, the basic units are further configured to obtain inner-product processing results by performing inner-product operations for each of the basic data blocks and the broadcast data block, to obtain the operation results by performing accumulation operation for each of the inner-product processing results respectively, and to send the operation results to the main unit.

In one embodiment, the main unit is further configured to obtain accumulated results by performing accumulation operation for each of the operation results respectively when the operation results are inner-product processing results, and to obtain the instruction result by arranging the accumulated results, where the instruction result is corresponding to the data blocks to-be-calculated and the operation instruction.

In one embodiment, the main unit is further configured to obtain a plurality of broadcast data sub-blocks by splitting the broadcast data block and to broadcast the plurality of broadcast data sub-blocks to the plurality of basic units by multiple broadcasts.

In one embodiment, the basic units are further configured to obtain inner-product processing results by performing one inner-product operation for each of the broadcast data sub-blocks and each of the basic data blocks, to obtain operation sub-results by performing accumulation operation for each of the inner-product processing results, and to send the operation sub-results to the main unit.

In one embodiment, the basic unit is configured to obtain n processing sub-results by multiplexing each of the broadcast data sub-blocks n times to perform inner-product operation with n basic units, to obtain n operation sub-results by performing accumulation operation for each of the n processing sub-results respectively, and to send the n operation sub-results to the main unit, where the n is an integer greater than or equal to two.

According to one embodiment of the present disclosure, an application method for the processing device illustrated in FIG. 1a is provided. The application method is applicable to perform one or any combination of a matrix-multiplying-matrix operation, a matrix-multiplying-vector operation, a convolution operation, or a fully connected operation.

In one embodiment, the main unit may further perform neural network operations such as a pooling operation, a normalization operation (for example, a batch normalization and a local response normalization (LRN)), and the like.

According to one embodiment of the present disclosure, a chip is provided, which includes the processing device illustrated in FIG. 1a or FIG. Ib.

According to one embodiment of the present disclosure, an intelligent device is provided, which includes the above-mentioned chip that integrates the processing device illustrated in FIG. 1a or FIG. 1b. The intelligent device includes, but is not limited to, a smart phone, a tablet computer, a personal digital assistant, a smart watch, a smart camera, a smart television, a smart refrigerator and other smart devices. The above-mentioned devices are for illustrative purposes only, and the specific embodiments of the present application are not limited to the specific forms of the above-mentioned devices.

For the matrix multiplication operation, reference can be made to the description of the embodiments illustrated in FIGS. 4a-4g, and details are not described herein again.

In one embodiment, the processing device perform a fully connected operation as follows.

Assuming input data of a fully connected layer is a vector of length L (such as a vector B in FIG. 4a containing a single sample of, that is, data transmitted in a single broadcast), output data of the fully connected layer is a vector of length M, and a weight of the fully connected layer is an M*L matrix (such as a matrix A in FIG. 4a). The weight matrix of the fully connected layer is implemented as the matrix A (i.e., distribution data block), and the input data of the fully connected layer is implemented as the vector B (i.e., broadcast data block). The fully connected operation can be performed according to the method illustrated in FIG. 2a.

In another implementation, assume that the input data of the fully connected layer is a matrix (that is, input data of the neural network is multiple samples which are operated together as a batch). The input data of the fully connected layer represents N input samples and each sample is a vector of length L, and then the input data is represented by a L*N matrix such as a matrix B in FIG. 4b containing multiple samples, and each output of each sample in the fully connected layer is a vector of length M. The output data of the fully connected layer is an M*N matrix, such as a result matrix in FIG. 4a contains multiple samples, the weight of the fully connected layer is an M*I, matrix (i.e., matrix A in FIG. 4a). In this case, the weight matrix of the fully connected layer is implemented as the matrix A (i.e., distribution data block), and the input data matrix of the fully connected layer is implemented as the matrix B (i.e., broadcast data block). Alternatively, the weight matrix of the fully connected layer is implemented as the matrix B (i.e., broadcast data block), and the input data matrix of the fully connected layer is implemented as the matrix A (i.e., distribution data block). The specific operations can be performed according to the method illustrated in FIG. 2a.

Figure 4C:
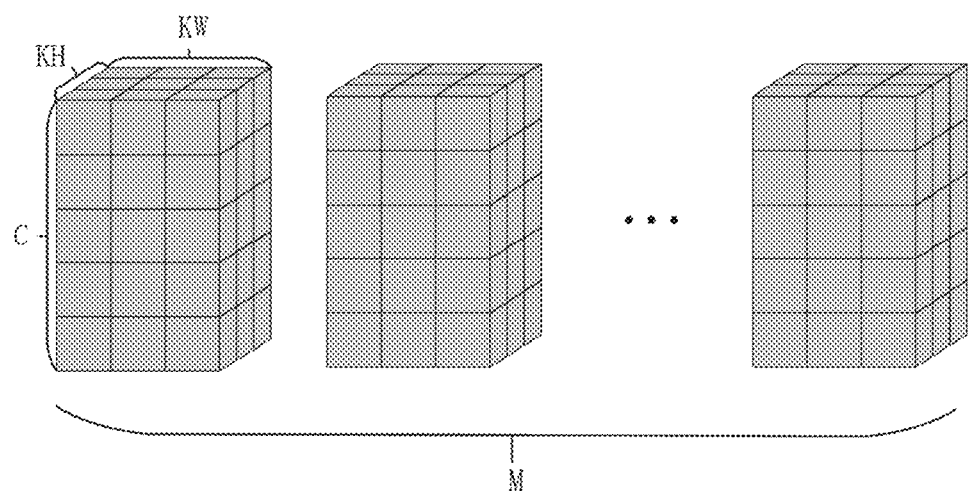
FIG. 4c is a schematic diagram illustrating M convolution kernels of an exemplary convolution.
Figure 4D:
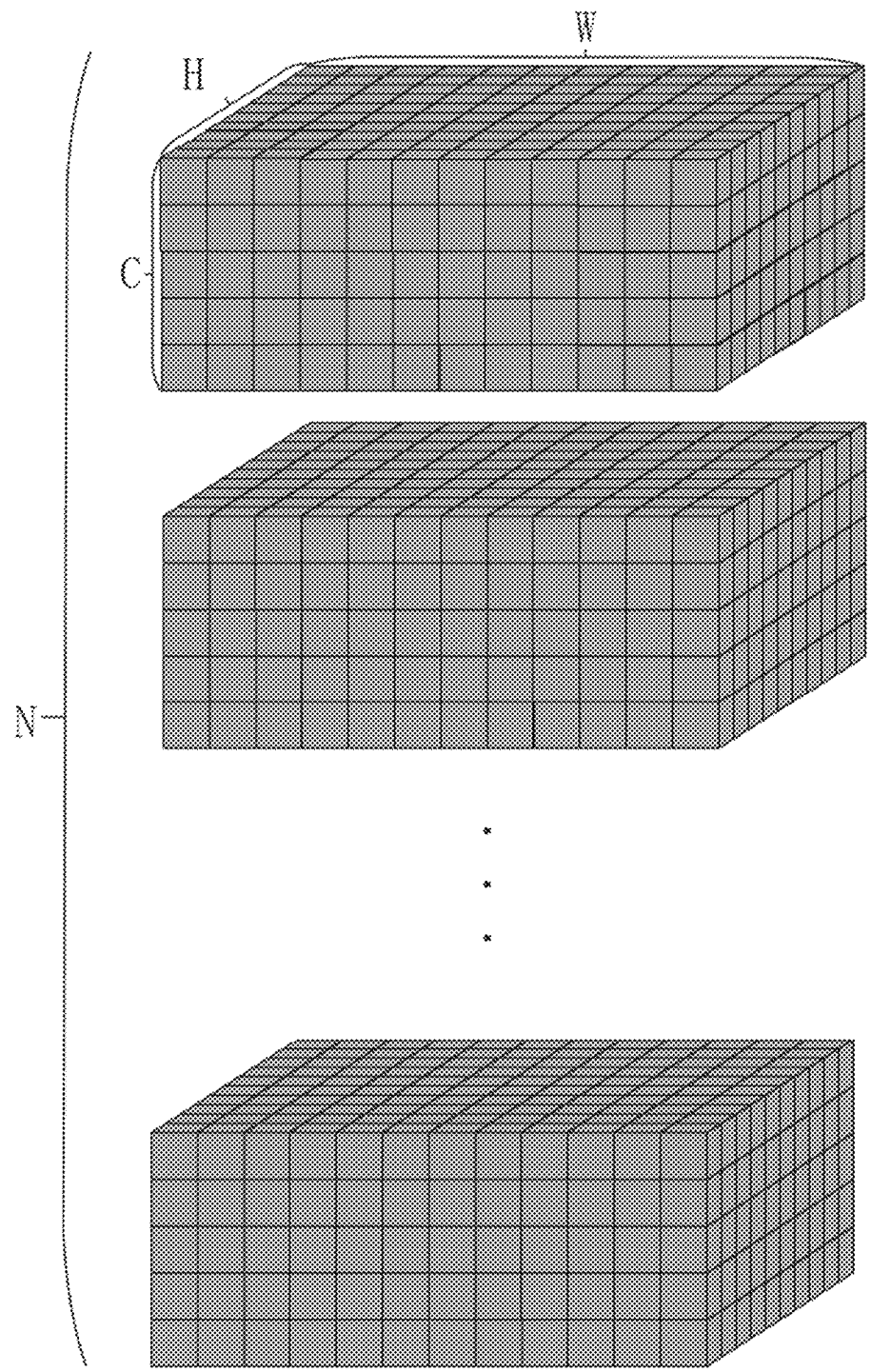
FIG. 4d is a schematic diagram illustrating input data of an exemplary convolution.

When the artificial neural network operation is performed by the processing device, exemplary input data of a convolutional layer, a pooling layer, a regularization layer, and the like in the neural network are illustrated in FIG. 4d. The regularization layer is also called a normalization layer, such as batch normalization (BN) or local response normalization (LRN). For the sake of clarity, the three-dimensional data block representing each sample is described with C=5, H=10, and W=12 as an example. In practice, the sizes of N, C, and W are not limited to those values illustrated in FIG. 4d. Each of the three-dimensional data blocks in FIG. 4d represents a sample corresponding to the input data of a layer. The three dimensions of each three-dimensional data block are represented by C, H and W, respectively, and the total number of the three-dimensional data blocks is N.

For the calculations of the above-mentioned neural network layers, when receiving the input data, the main unit arranges each sample of the input data in a certain order through the data rearrangement circuit of the main unit, where the order may be arbitrary.

For example, the input data may be arranged in an order that coordinates of data in the dimension C vary, such as in an order of NHWC, NWHC, and the like, where C is the dimension of the innermost layer of a data block, N is the dimension of the outermost layer of the data block, and H and W are the dimensions of the middle layer of the data block. In this way, the data in dimension C is arranged adjacently and consecutively, thereby facilitating an increase of operation parallelism and parallel operations for multiple feature maps.

Figure 4E:
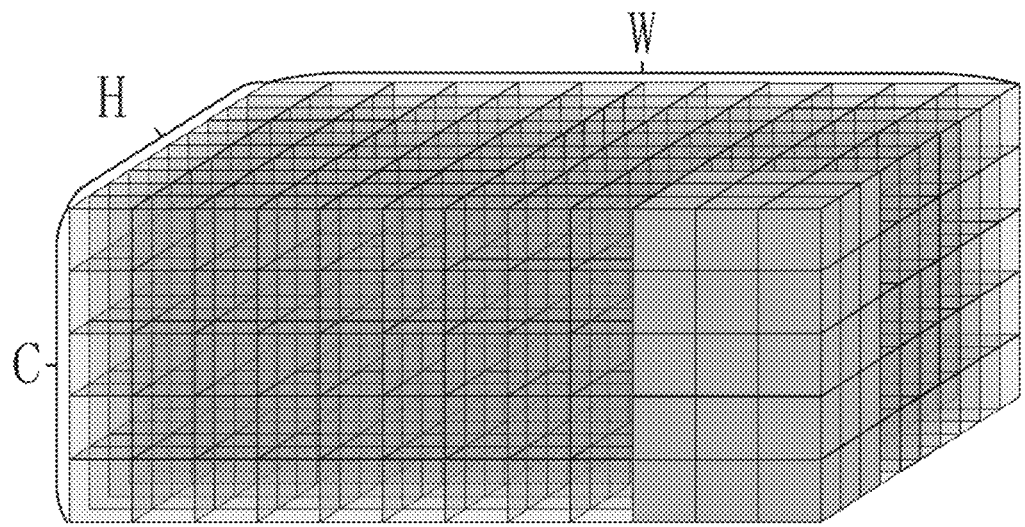
FIG. 4e is a schematic diagram illustrating a sliding operation window of a three-dimensional data block of input data.
Figure 4F:
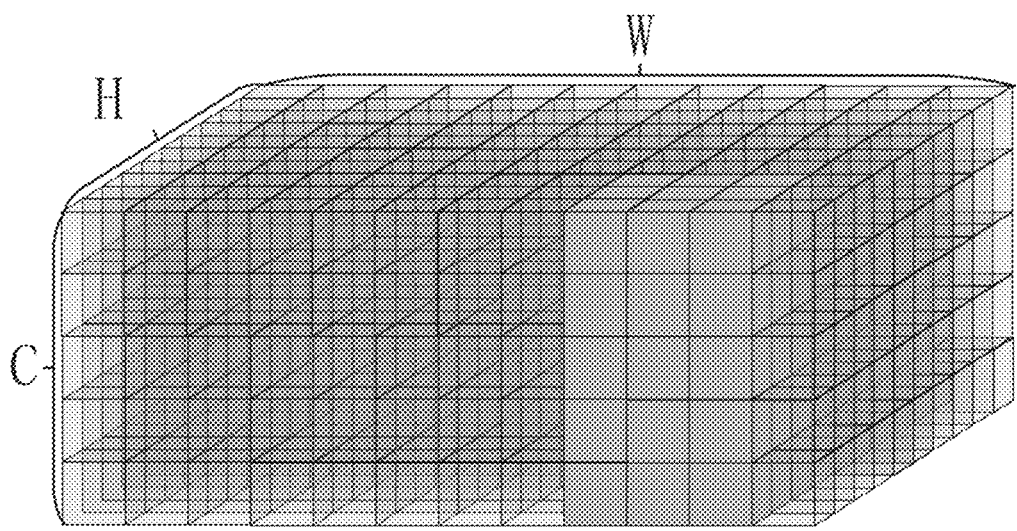
FIG. 4f is a schematic diagram illustration another sliding operation window of a three-dimensional data block of input data.
Figure 4G:
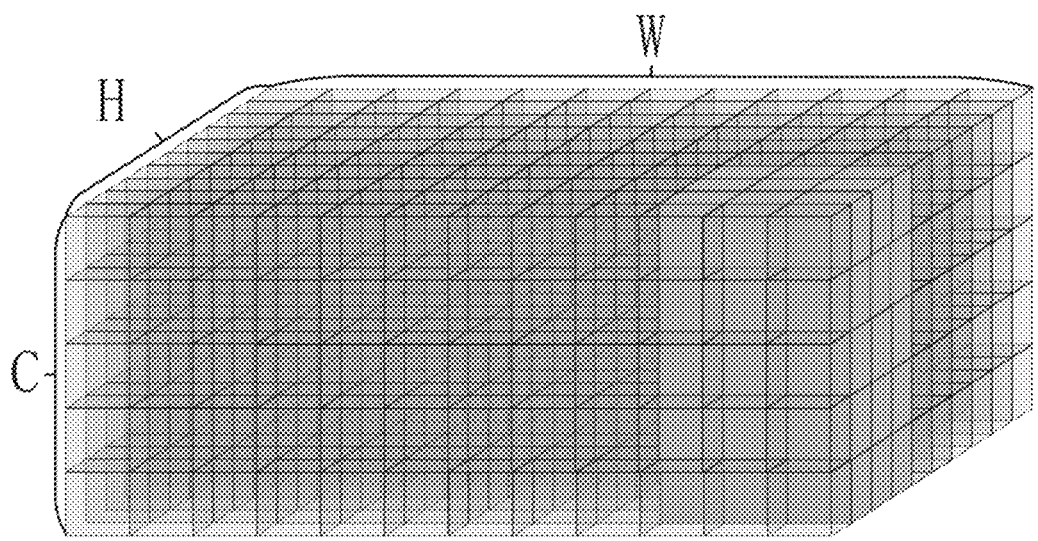
FIG. 4g is a schematic diagram illustration yet another sliding operation window of a three-dimensional data block of input data.

The following implementations are described for the understanding of dimensions C, H, and W according to different neural network operations. For a convolution operation and a pooling operation, H and W are dimensions in which relevant operation windows slide when performing convolution and pooling operations. The operation window sliding in dimension W is illustrated in FIG. 4e (illustrating a sliding a) and FIG. 4f (illustrating a sliding b). The operation window sliding in dimension H is illustrated in FIG. 4g. The size of the operation window is the same as the size of a convolution kernel in M convolution kernels. For example, as illustrated in FIG. 4c, each of the M convolution kernels is a 5*3*3 three-dimensional data block, and then the operation window is also a 5*3*3 three-dimensional data block. For the M convolution kernels illustrated in FIG. 4c, KH represents the dimension H of input data, and KW represents the dimension W of the input data. Gray squares in FIGS. 4e, 4f, and 4g represent data to be calculated each time the operation window is slid, and the operation window may be operated to first slide in the dimension H and then to slide in dimension W; alternatively, the operation window may be operated to first slide in dimension W and then to slide in dimension H. Specifically, for the convolution operation, operations in each position of the operation window include performing inner-product operations for the data blocks indicated by the gray squares with the M convolution kernel data blocks illustrated in FIG. 4c respectively, such that one value may be output by each of the M convolution kernels each time the operation window is slid, that is, there are M values will be output at each position of the operation window (that is, each time the operation window is slid). For the pooling operation, operations in each position of the operation window include obtaining a maximum value, an average value, or the like, among the data blocks indicated by the gray squares in dimension H and dimension W (that is, 9 data blocks on the same plane of the gray data block in dimension H and dimension W), that is, there are C values will be output at each position of the operation window. C is another dimension in the three-dimensional data block of a single sample other than H and W, and N represents a total of N samples simultaneously performing the operation in a layer. For the LRN in the regularization operation, the dimension C is defined as a dimension along which the LRN operation selects a continuous data block (i.e., a data block of Y*1*1) each time, where Y in the data block of Y*1*1 is a value of the number of data selected in the dimension C, the value of Y is less than or equal to the maximum value of the number of data in the dimension C, the first "1" represents the number of data selected in the dimension H, and the second "1" represents the number of data selected in the dimension W. That is, when the regularization operation LRN is performed for each of the three-dimensional data blocks of one sample, each regularization operation LRN is performed for a part of the continuous data with the same W coordinate and H coordinate but different C coordinate. For the regularization operation BN, an average and a variance (or a standard deviation) of all values that have the same coordinate on dimension C in the three-dimensional data block of the N samples are calculated.

Each of squares in FIG. 4c to FIG. 4g represents a value, which may also be called a weight. The numbers used in the diagram are for illustrative purposes only. In practice, a dimension value may be any value (for example, a certain dimensional value is one, in this case the four-dimensional data block automatically becomes a three-dimensional data block. For another example, when the number of samples simultaneously calculated is one, the input data is a three-dimensional data block. For yet another example, when the number of convolution kernel is one, the convolution kernel data is a three-dimensional data block). A convolution operation between input data B and convolution kernel A is performed by the processing device.

A weight (all convolution kernels) of a convolution layer is illustrated in FIG. 4c. The number of convolution kernels is M, and each convolution kernel consists of C matrices of rows and KW columns, and the weight of the convolutional layer may be expressed as a four-dimensional data block with four dimensions of M, C, KH, and KW. The input data of the convolutional layer is a four-dimensional data block, which consists of N three-dimensional data blocks, and each of the three-dimensional data blocks consists of C characteristic matrices of H rows and W columns (i.e., a data block with four dimensions of N, C, H, W), as shown in FIG. 4d. A weight of each of the M convolution kernels is distributed from the main unit to one of K basic unit, and stored in an on-chip buffer and/or register of the basic unit (in this case, the M convolution kernels are implemented as distribution data blocks, and each convolution kernel can be implemented as a basic data block. Of course, in practical applications, the basic data block can also be changed into a smaller dimension, such as a matrix of a plane in a kernel). The specific method of distribution can be implemented as follows. When the number of the convolution kernels is M and M<=K, each of the M basic units is distributed with one weight of convolution kernels. When the number of the convolution kernels is M and M>K, each of the M basic units is distributed with one or more weights of convolution kernels. The convolution kernel weight set distributed to the $i^{th}$ basic unit is denoted by Ai, and there are a total of Mi convolution kernels. For each basic unit, such as the $i^{th}$ basic unit, the received convolution kernel weight Ai distributed by the main unit is stored in register and/or on-chip buffer of the basic unit. The main unit transmits each part of input data (such as data in operation windows illustrated in FIG. 4e, FIG. 4f and FIG. 4g) to each basic unit in broadcast manner (such as the over-mentioned method A or method B). When broadcasting, the weights of the operation window can be broadcast to all the basic units by multiple broadcasts. Specifically, a part of the weights of the operation window may be broadcasted each time. For example, a matrix of data in a plane is broadcasted each time, and taking FIG. 4e as an example, a KH*KW matrix on plane C can be broadcasted each time. In practical applications, first front n rows or first front n columns of a KH*HW matrix on plane C can also be broadcast at one time. The manner in which the above partial data is transmitted and the arrangement of partial data is not limited by the present disclosure. The input data may be arranged in an arbitrary dimension order, and then each part of the input data is sequentially broadcast to the basic unit. In one embodiment, the foregoing distribution data (that is, the convolution kernels), may also be sent in a manner similar to that of the operation window of the input data, and details are not described herein again. In one embodiment, the input data can be arranged in a cycle where the dimension C is in the innermost layer, in this way, the data in dimension C is arranged adjacently and consecutively, thereby facilitating an increase of operation parallelism and parallel operations for multiple feature maps. In one embodiment, the input data can be arranged in a dimension order of NHWC or NWHC. Each basic unit, such as the basic unit, calculates the inner product of the convolution kernel in the weight Ai and a corresponding part of the received broadcast data (i.e., a part of data in the operation window), where the data of the corresponding part of the weight Ai can be read directly from the on-chip buffer, or can be read into the register for multiplexing. In one embodiment, an accumulation operation may be performed for each of the inner-product processing results of basic units to obtain operation results, and then the operation results may be transmitted back to the main unit. Alternatively, each of the inner-product processing results of basic units may be transmitted back to the main unit, and then the main unit may perform an accumulation operation for each of the inner-product processing results. In one embodiment, a sub-sum obtained by performing the inner-product operation via each basic unit may be stored and accumulated in the on-chip buffer and/or the register of the basic unit, and then transmitted back to the main unit. In one embodiment, in some cases, a sub-sum obtained by performing the inner-product operation via each basic unit may be stored and accumulated in the on-chip buffer and/or the register of the basic unit, and then transmitted back to the main unit, in other cases, a sub-sum obtained by performing the inner-product operation via each basic unit may be directly transmitted to the basic unit and then accumulated by the main unit.

A method for implementing a basic linear algebra sub-programs (BLAS) function by the processing device is provided as follows.

General matrix multiply (GEMM) calculation refers to the matrix multiplication operation in the BLAS library, which is normally expressed as C alpha*op(A)*op(B)+beta*C, where A and B are two input matrices, C is a output matrix, alpha and beta are scalars, and op represents an operation for matrix A or B. In addition, there will be some supplementary integers as parameters to explain the width and height of the matrices A and B.

Operations for implementing a GEMM calculation by the processing device are described as follows.

The main unit of the processing device performs corresponding op operations on matrix A and matrix B respectively. The op operation may be a matrix transposition or other operations, such as nonlinear function operation, pooling operation, and so on. The matrix op operation is implemented by the vector operation function of the main unit. The op of a matrix may be null, it indicates that the main unit performs no operation on the matrix.

A matrix multiplication of op(A) and op(B) is completed by employing the method illustrated in FIG. 2a.

Each value of the results of op(A)*op(B) is multiplied by alpha, by employing the vector operation function of the main unit.

Data at corresponding positions in op(A)*op(B) and beta*C are added, by employing the vector operation function of the main unit.

General matrix-vector (GEMV) calculation refers to the matrix-multiplying-vector operation in the BLAS library, which is normally expressed as C=alpha*op(A)*B+beta*C, where A is an input matrix, B is an input vector, C is a output matrix, alpha and beta are scalars, and op represents an operation for matrix A.

Operations for implementing a GEMV calculation by the processing device are described as follows.

The main unit of the processing device performs a corresponding op operation on matrix A. The processing device completes the matrix-multiplying-vector operation of the matrix op(A) and the vector B. Each value of the results of op(A)*B is multiplied by alpha, by employing the vector operation function of the main unit. Data at corresponding positions in op(A)* B and beta*C are added, by employing the vector operation function of the main unit.

A method for implementing an activation function operation is provided as follows.

An activation function operation generally refers to performing a nonlinear operation for each data of a data block (such as a vector or a multi-dimensional matrix). For example, the activation function may be expressed as y=max (m, x), where x is an input value, v is an output value, and m is a constant. For example, the activation function may be expressed as y=tan h(x), where x is an input value and y is an output value. For another example, the activation function can be expressed as y=sigmoid(x), where x is an input value and y is an output value. For yet another example, the activation function may be a piecewise linear function. For still yet another example, the activation function can be any function that outputs a value when a value is inputted.

In a process for implementing an activation function operation, the processing device may input a vector to calculate an activation vector corresponding to the vector, by employing the vector operation function of the main unit. The main unit performs an activation function operation on each value of an input vector to obtain an output value, when the input of the activation function is a value, the output is also a value, and output the output value into the corresponding position of an output vector.

The above-mentioned input vector may be obtained from, but not limited to, external data of the processing device, and calculation result data of the basic unit forwarded by the branch unit of the processing device.

The above-mentioned calculation result data may specifically be an operation result of a matrix-multiplying-vector operation. The calculation result data may further be an operation result of a matrix-multiplying-matrix operation. The calculation result data may be an operation result of an add-offset operation implemented by the main unit.

A method for implementing an add-offset operation by the main unit is provided as follows.

Two vectors or two matrices can be added by the main unit. A vector can be added with each row or each columns of a matrix by the main unit For example, the above-mentioned matrix may be a result of a matrix-multiplying-matrix operation performed by the processing device. The matrix may be a result of a matrix-multiplying-vector operation performed by the processing device. The matrix may be determined from external data received by the processing device.

The above-mentioned input data and the calculation result data are merely illustrative. In practical applications, data of other types or sources may also be applicable. The specific embodiments of the present disclosure do not limit the source and expression manner of the above-mentioned data.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

In addition, the functional units in various embodiments of the present disclosure may be integrated into one processing unit, or each unit may be physically present, or two or more units may be integrated into one unit. The above-mentioned integrated unit/module can be implemented in the form of hardware. For example, the hardware can be a circuit, including a digital circuit, an analog circuit, and the like. Physical implementations of hardware structures include, but are not limited to, physical elements. The physical elements include, but not limited to, transistors, memristors, and the like. The calculating modules in a calculating device can be any suitable hardware processor, such as a CPU, a GPU, a field programmable gate array (FPGA), a digital signal processor (DSP), an application specific integrated circuit (ASIC), and the like. The storage unit may be any suitable magnetic storage medium or magneto-optical storage medium such as a resistive random access memory (RRAM), a dynamic random access memory (DRAM), a static random access memory (SRAM), an enhanced DRAM (EDRAM), a high bandwidth memory (HBM), a hybrid memory cube (HMC), and the like.

The units described may or may not be physically separated, that is, they may be in the same place or may be distributed to multiple network elements. All or part of the units may be selected according to actual needs to achieve the purpose of the technical solutions of the embodiments.

The embodiments of the present disclosure have been described in detail above, and the principles and implementations of the present disclosure are described in the specific examples. The description of the above embodiments is merely used to facilitate understanding the method and core ideas of the present disclosure. For a person of ordinary skill in the art, in light of the present disclosure, there may be changes in the specific implementation and application scope. The contents of the present specification should not be construed as limiting the disclosure.

What is claimed is:

1. A method, performed by a processing device comprising a main processing circuit and a first plurality of basic processing circuits for performing operations to a neural network, the method comprising:
   receiving, by the main processing circuit, input data, weight data, and an operation instruction;
   designating, by the main processing circuit, the input data as distribution data and the weight data as broadcasting data, or, the input data as the broadcasting data and the weight data as the distribution data;
   dividing, by the main processing circuit, the distribution data into a second plurality of basic data blocks;
   distributing, by the main processing circuit, the second plurality of basic data blocks to the first plurality of basic processing circuits, wherein each of the second plurality of basic data blocks is distributed to one of the first plurality of the basic processing circuits and at least two basic processing circuits receive different basic data blocks;
   broadcasting, by the main processing circuit, the broadcasting data to the first plurality of basic processing circuits, wherein each of the first plurality of basic processing circuits receives the broadcasting data;
   performing, by each of the first plurality of basic processing circuits, one or more inner-product operations on one or more basic data blocks distributed to that basic processing circuit and the broadcasting data broadcast to that basic processing circuit to obtain a processing result, wherein the first plurality of basic processing circuits perform the respective inner-product operations in parallel;

providing, by the first plurality of basic processing circuits, the respective processing results to the main processing circuit; and combining, by the main processing circuit, the processing results provided by the first plurality of basic processing circuits to obtain a computation result of the operation instruction.

2. The method of claim 1, wherein designating the input data as the distribution data and the weight data as the broadcasting data, or, the input data as the broadcasting data and the weight data as the distribution data further includes:

designating, by the main processing circuit, the input data as the broadcasting data and the weight data as the distribution data when the input data is a vector and the weight data is a matrix.

3. The method of claim 1, wherein designating the input data as the distribution data and the weight data as the broadcasting data, or, the input data as the broadcasting data and the weight data as the distribution data further includes:

designating, by the main processing circuit, either the input data or the weight data as the distribution data and the other one as the broadcasting data when both the input data and the weight data are matrices.

4. The method of claim 1, wherein the input data comprises data vectors representing a plurality of input samples of the neural network.

5. The method of claim 1, wherein distributing the second plurality of basic data blocks to the first plurality of basic processing circuits further includes:

distributing the second plurality of basic data blocks to the first plurality of basic processing circuits non-repetitively and in an arbitrary order.

6. The method of claim 1, wherein distributing the second plurality of basic data blocks to the first plurality of basic processing circuits includes:

when a number of the second plurality of basic data blocks is larger than a number of the first plurality of basic processing circuits, distributing, by the main processing circuit, one or more of the second plurality of basic data blocks to each basic processing circuit; and when the number of the second plurality of basic data blocks is smaller than or equal to the number of the first plurality of basic processing circuits, distributing, by the main processing circuit, each of the second plurality of basic data blocks to a separate basic processing circuit.

7. The method of claim 1, wherein the processing device further includes multiple branch processing circuits configured to connect the main processing circuit to the first plurality of basic processing circuits, and the method further includes:

transmitting, by the multiple branch processing circuits, data among the main processing circuit and the first plurality of basic processing circuits.

8. The method of claim 1, wherein the main processing circuit includes at least one of a vector arithmetic unit circuit, an arithmetic logic unit (ALU) circuit, an accumulator circuit, a matrix transposition circuit, a direct memory access (DMA) circuit, or a data rearrangement circuit.

9. The method of claim 1, wherein each of the first plurality of basic processing circuits includes an inner-product arithmetic unit circuit or an accumulator circuit.

10. A processing device comprising a main processing circuit and a first plurality of basic processing circuits, wherein:

the main processing circuit is configured to:
receive input data, weight data, and an operation instruction;

designate the input data as distribution data and the weight data as broadcasting data, or, the input data as the broadcasting data and the weight data as the distribution data;

divide the distribution data into a second plurality of basic data blocks;

distribute the second plurality of basic data blocks to the first plurality of basic processing circuits, wherein each of the second plurality of basic data blocks is distributed to one of the first plurality of the basic processing circuits and at least two basic processing circuits receive different basic data blocks; and broadcast the broadcasting data to the first plurality of basic processing circuits, wherein each of the first plurality of basic processing circuits receives the broadcasting data, each of the first plurality of basic processing circuits is configured to:
perform one or more inner-product operations on one or more basic data blocks distributed to that basic processing circuit and the broadcasting data broadcast to that basic processing circuit to obtain a processing result; and provide the processing result to the main processing circuit;

wherein the first plurality of basic processing circuits are configured to perform the respective inner-product operations in parallel; and the main processing circuit is further configured to combine the processing results provided by the first plurality of basic processing circuits to obtain a computation result of the fully connected operation instruction.

11. The processing device of claim 10, wherein the main processing circuit is configured to designate the input data as the broadcasting data and the weight data as the distribution data when the input data is a vector and the weight data is a matrix.

12. The processing device of claim 10, wherein the main processing circuit is configured to designate either the input data or the weight data as the distribution data, and the other one as the broadcasting data when the input data and the weight data are both matrices.

13. The processing device of claim 10, wherein the input data comprises data vectors representing a plurality of input samples.

14. The processing device of claim 10, wherein the main processing circuit is configured to distribute the second plurality of basic data blocks to the first plurality of basic processing circuits non-repetitively and in an arbitrary order.

15. The processing device of claim 10, wherein the main processing circuit is configured to:

distribute one or more of the second plurality of basic data blocks to each basic processing circuit when a number of the second plurality of basic data blocks is larger than a number of the first plurality of basic processing circuits; and distribute each of the second plurality of basic data blocks to a separate basic processing circuit when the number of the second plurality of basic data blocks is smaller than or equal to the number of the first plurality of basic processing circuits.

16. The processing device of claim 10, wherein the processing device further includes multiple branch processing circuits configured to:
    connect the main processing circuit to the first plurality of basic processing circuits; and
    transmit data among the main processing circuit and the first plurality of basic processing circuits.

17. The processing device of claim 16, wherein each of the multiple branch processing circuits is connected between the main processing circuit and at least one of the first plurality of basic processing circuits.

18. The processing device of claim 10, wherein the main processing circuit includes at least one of a vector arithmetic unit circuit, an arithmetic logic unit (ALU) circuit, an accumulator circuit, a matrix transposition circuit, a direct memory access (DMA) circuit, or a data rearrangement circuit.

19. The processing device of claim 10, wherein each of the first plurality of basic processing circuits includes an inner-product arithmetic unit circuit or an accumulator circuit.

20. A computer readable storage medium having computer instructions stored thereon, wherein the computer instructions, when executed by a processing device comprising a main processing circuit and a first plurality of basic processing circuits, perform a method comprising:
    receiving, by the main processing circuit, input data, weight data, and an operation instruction;
    designating, by the main processing circuit, the input data as distribution data and the weight data as broadcasting data, or, the input data as the broadcasting data and the weight data as the distribution data;
    dividing, by the main processing circuit, the distribution data into a second plurality of basic data blocks;
    distributing, by the main processing circuit, the second plurality of basic data blocks to the first plurality of basic processing circuits, wherein each of the second plurality of basic data blocks is distributed to one of the first plurality of the basic processing circuits and at least two basic processing circuits receive different basic data blocks;
    broadcasting, by the main processing circuit, the broadcasting data to the first plurality of basic processing circuits, wherein each of the first plurality of basic processing circuits receives the broadcasting data;
    performing, by each of the first plurality of basic processing circuits, one or more inner-product operations on one or more basic data blocks distributed to that basic processing circuit and the broadcasting data broadcast to that basic processing circuit to obtain a processing result, wherein the first plurality of basic processing circuits perform the respective inner-product operations in parallel;
    providing, by the first plurality of basic processing circuits, the respective processing results to the main processing circuit; and
    combining, by the main processing circuit, the processing results provided by the first plurality of basic processing circuits to obtain a computation result of the operation instruction.

* * * * *